(12) United States Patent
Predtechensky et al.

(10) Patent No.: US 8,551,413 B2
(45) Date of Patent: Oct. 8, 2013

(54) SYSTEM AND METHOD FOR PRODUCING CARBON NANOTUBES

(75) Inventors: Mikhail Rudolfovich Predtechensky, Novosibirsk (RU); Oleg Mikhailovich Tukhto, Novosibirsk (RU); Ilya Yurievich Koval, Novosibirsk (RU)

(73) Assignee: MCD Technologies S.A R. L., Luxembourg (LU)

( * ) Notice: Subject to any disclaimer, the term of this patent is extended or adjusted under 35 U.S.C. 154(b) by 0 days.

(21) Appl. No.: 13/017,021

(22) Filed: Jan. 30, 2011

(65) Prior Publication Data

US 2012/0195820 A1 Aug. 2, 2012

(51) Int. Cl.
*B01J 19/08* (2006.01)
*D01F 9/127* (2006.01)

(52) U.S. Cl.
USPC ............... 422/186.21; 423/447.3; 977/843; 977/844; 204/173

(58) Field of Classification Search
USPC ............ 422/186.21, 186.22, 186.23, 186.24, 422/186.25, 186.26, 186.27, 186.28, 186.29, 422/186.04
See application file for complete search history.

(56) References Cited

U.S. PATENT DOCUMENTS

| | | | |
|---|---|---|---|
| 3,808,239 | A | 4/1974 | Rolker |
| 6,846,467 | B1 * | 1/2005 | Predtechensky ......... 422/186.21 |
| 6,875,417 | B1 | 4/2005 | Shah |
| 7,094,385 | B2 | 8/2006 | Beguin |
| 2003/0099592 | A1 | 5/2003 | Rodriguez |
| 2005/0163696 | A1 | 7/2005 | Uhm et al. |
| 2007/0281087 | A1 | 12/2007 | Harutyunyan |
| 2010/0290981 | A1 | 11/2010 | Katz |

OTHER PUBLICATIONS

Predtechenskii, et al., Plasma Torch with Meltable Electrodes: From Research to Novel Technologies, High Energy Chemistry 2009; 43: 219-223.*
"Definition of arc," accessed online at <http://www.merriam-webster.com/dictionary/arc> on Jun. 13, 2013.*
Sinnott, et al., Model of carbon nanotube growth through chemical vapor deposition, Chemical Physics Letters 1999; 315: 25-30.
Harbec, et al., Carbon nanotubes from the dissociation of C2Cl4 using a dc thermal plasma torch, J. Phys. D: Appl. Phys. 2004; 37: 2121-2126.

* cited by examiner

*Primary Examiner* — Daniel C McCracken
(74) *Attorney, Agent, or Firm* — Bardmesser Law Group

(57) ABSTRACT

A method of producing carbon nanotubes, comprising, in a reaction chamber: evaporating at least a partially melted electrode comprising a catalyst by an electrical arc discharge; condensing the evaporated catalyst vapors to form nanoparticles comprising the catalyst; and decomposing gaseous hydrocarbons in the presence of the nanoparticles to form carbon nanotubes on the surface of the nanoparticles. Also a system for producing carbon nanotubes, comprising: a reactor comprising two electrodes, wherein at least one of the electrodes is at least a partially melted electrode comprising a catalyst, the reactor adapted for evaporating the at least partially melted electrode by an electrical arc discharge and for condensing its vapors to form nanoparticles comprising the catalyst, wherein the electrodes are disposed in a reaction chamber for decomposing gaseous hydrocarbons in the presence of the nanoparticles to form carbon nanotubes on the surface of the nanoparticles.

18 Claims, 7 Drawing Sheets

SYSTEM AND METHOD FOR PRODUCING CARBON NANOTUBES

TECHNICAL FIELD

The present invention relates to methods and systems for synthesizing carbon nanotubes, and, in particular, to methods and systems for catalytic synthesis of carbon nanotubes.

The invention has been developed primarily for use in efficient nanotubes synthesis using catalytic hydrocarbon decomposition inside a reaction chamber of a reactor with high yield and will be described hereinafter with reference to this application. However, it will be appreciated that the invention is not limited to this particular field of use or application.

BACKGROUND OF THE RELATED ART

Any discussion of the background art throughout the specification should in no way be considered as an admission that such background art is prior art, nor that such background art is widely known or forms part of the common general knowledge in the field.

Carbon nanotubes, an allotrope of carbon with a cylindrical nanostructure, have attracted a considerable amount of interest recently due to their unique properties. Their use is highly attractive across many fields of technology, including electronics, optics and other fields of materials science, as well as potential uses in construction methods. Nanotubes are characterised by their extremely large length-to-diameter ratio of many million times to 1 and exhibit extraordinary strength and unique electrical properties, as well as high efficiency as thermal conductors.

There are various conventional methods of producing carbon nanotubes: electric arc discharge, catalytic hydrocarbon decomposition, laser ablation, high pressure carbon monoxide (HiPco), thermal chemical deposition, plasma chemical deposition and others.

Nanotubes are formed as graphite sheets (also known as graphene), in which atoms of carbon are arranged hexagonally in a sheet a single atom thick, and wrapped into a seamless cylinder. A cylinder formed from a single graphite sheet is a known as single-walled nanotubes, and typically has a diameter between about one nanometer to a few tens of nanometers (about 30 to 50 nm) and a length that may be many orders of magnitude longer. Multi-walled nanotubes may also be formed from concentric cylinders of graphite sheet, itself comprising several graphite sheets, which may be between two and about 50 walls, typically between about 2 to 10. Such multi-walled nanotubes may have a diameter between about a few (about 2 to 5 nm) nanometers to a few tens of nanometers (about 30 to 50 nm). Single-walled carbon tubes are primarily produced using an arc discharge method utilizing carbon electrodes in an environment containing a metallic catalyst, or where the anode electrode used for producing the arc discharge comprises a metallic catalyst substance. The main limitations of the arc discharge method, however is low nanotube yield, typically no more than about 25% to 30% by weight of total carbon mass, the relatively small size of the nanotubes produced (typically having lengths of up to about 50 to 1000 nanometers, difficulties associated with separating out the nanotubes in a pure form, and difficulties with varying diameter and length dimensions of the nanotubes formed by this process.

Catalytic methods of carbon nanotubes production can overcome many of the difficulties with arc discharges methods, and by varying the conditions of the catalytic carbon nanotube synthesis, formation of undesirable amorphous carbon may be drastically reduced. Varying catalyst parameters and conditions of decomposition of hydrocarbon feedstock, carbon nanotubes diameter and length can be changed together with their high yield (on a weighted basis) together with low concentration, or the lack of amorphous carbon. Separating the formed nanotubes is also easier using catalytic synthesis methods, where carbon material may be separated from metal and oxides using ultrasound or one of a variety of different chemical treatment methods, thus permitting pure nanotubes with open ends to be readily obtained. Also, using catalytic synthesis methods, it is possible to obtain straight, inclined and twisted nanotubes of fullerene diameters, representing both theoretical and practical interest.

However, despite these advantages, present catalytic synthesis methods of carbon nanotubes synthesis are high cost, which is driven by large volume of catalyst usage and low yield of carbon nanotubes per unit of mass of catalyst. The are methods for producing carbon nanotubes which output a yield per unit mass of catalyst of greater than 100, however, the main obstacle affecting the yield using conventional techniques is the high cost of obtaining the catalyst itself. In current processing methods for producing a catalyst, the preparation of the catalyst and subsequent processes for the synthesis of nanotubes are separated into different technological processes running on different process equipment.

The main disadvantage of current nanotube production processes is that they are multistage processes. Typically, the process of manufacturing the catalyst goes through several stages. The catalyst is typically prepared in the form of either agglomerates or in a powder form on a substrate. In the case of catalysts in agglomerate form, problems are encountered with separation of entangled nanotubes and fibers synthesized on the catalyst. In the case of a catalyst formed on a substrate, problems are encountered in separation of the synthesized nanotubes from the substrate.

Therefore, a need exists for an improved process for catalyst preparation and synthesis of nanotubes. There is also a need for a low cost, yet high yield method for rapid synthesis of large quantities of high quality pure carbon nanotubes with uniform dimensionality to meet the demands of the many varied technological applications for these nanotubes.

It is therefore an object of the present invention to address the disadvantages of the prior art, or at least to provide a useful alternative to existing synthesis methods for carbon nanotubes, and/or systems and apparatus for their production in large quantities.

SUMMARY OF THE INVENTION

Disclosed herein is a process of catalyst preparation and synthesis of nanotubes and apparatus for synthesis of nanotubes. In the methods disclosed herein, the catalyst preparation and nanotube synthesis is realized simultaneously in a single apparatus as disclosed herein. The methods and apparatus disclosed herein have significant advantages over conventional nanotube synthesis methods including simultaneous catalyst preparation and nanotube synthesis, ease of separation of the synthesized nanotubes from the catalysts and continuous apparatus operation for continuous nanotube synthesis.

According to a first aspect, there is provided a method of producing carbon nanotubes. The method may comprise, in a reaction chamber, at least partially evaporating melted electrode comprising a catalyst, by an electrical arc discharge. The method may further comprise condensing the evaporated catalyst vapors to form nanoparticles comprising the catalyst.

The method may further comprise decomposing gaseous hydrocarbons in the presence of the nanoparticles to form carbon nanotubes on the surface of the nanoparticles.

In any of the aspects or arrangements described herein, the method may also comprise one or more of any of the following either taken alone or in any suitable combination.

In an arrangement of the first aspect, there is provided a method of producing carbon nanotubes, comprising, in a reaction chamber: evaporating at least a partially melted electrode comprising a catalyst by an electrical arc discharge; condensing the evaporated catalyst vapors to form nanoparticles comprising the catalyst; and decomposing gaseous hydrocarbons in the presence of the nanoparticles to form carbon nanotubes on the surface of the nanoparticles.

The at least partially melted electrode may comprise metal. As would be appreciated by the skilled addressee, there is a wide range of metals and alloys which may also be used as catalysts for nanotube growth. The electrode may be entirely formed from a catalyst material, or may comprise a mixture of the catalyst and other metals. The electrode may comprise greater than 20%, greater than 30% greater than 40% greater than 50% greater then 60%, greater than 70%, greater than 80%, greater than 90% greater than 95% up to about 100% of catalyst material.

The catalyst may comprise or be a transition metal selected from the group of a Group 8 element, a Group 6B element, a Group 5B element, or a mixture of two, three, four or more transition metal elements. The catalyst may comprise or be a transition metal selected from the group comprising scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, or a mixture comprising two, three, four or more transition metals. The catalyst may comprise or be a Group 8 metal selected from the group comprising: cobalt, nickel, ruthenium, rhodium, palladium, iridium, iron, platinum, or a mixture comprising two, three, four or more Group 8 metals. The catalyst may alternatively comprise or be a Group 6B element selected from the group comprising: chromium, molybdenum, tungsten or a mixture of two, three, four or more Group 6B elements. The catalyst may alternatively comprise or be a Group 5B element selected from the group comprising: vanadium; niobium, tantalum, or a mixture of two, three, four or more Group 5B elements. Alternatively, the catalyst may be a mixture of two, three, four or more elements selected from the group comprising: cobalt, nickel, ruthenium, rhodium, palladium, iridium, iron, platinum, chromium, molybdenum, tungsten, vanadium; niobium, tantalum or other Group 5B, Group 6 or Group 8 elements or transition metal. The electrode may be entirely formed from the catalyst material, or may comprise a mixture of the catalyst and a filler. The electrode may comprise greater than 20%, greater than 30% greater than 40% greater than 50% greater then 60%, greater than 70%, greater than 80%, greater than 90% greater than 95% up to about 100% of catalyst material.

The electrical arc discharge may be formed between the at least partially melted electrode and a solid electrode. The solid electrode may comprise graphite or a refractory metal, for example tungsten, molybdenum, niobium, tantalum or rhenium or alloys thereof.

The electrical arc discharge may be formed using a plasma arc torch with at least one electrode which is at least partially or wholly molten. The electrical arc discharge may be formed between the at least partially melted electrode, and a second at least partially melted electrode, where the second at least partially melted electrode is housed in a second reaction chamber. The first and second reaction chambers may be interconnected by an arc discharge channel. The method may comprise forming the electrical arc discharge in the arc discharge channel such that the at least partially melted electrode in each of the first and second reaction chambers is evaporated by the electrical arc discharge. The electric arc discharge may pass through the discharge channel.

In use, a plasma-forming gas may be introduced into the discharge channel to form the electrical arc discharge. The plasma-forming gas may be introduced into the discharge channel in a form of a vortex stream for the formation of a vortex flow using standard well-known methods. The plasma-forming gas may be introduced into the discharge channel tangentially to form a vortex flow stabilizing the arc discharge. The plasma-forming gas may comprise gaseous hydrocarbon. The plasma-forming gas may comprise inert gas. The plasma-forming gas may comprise one or more of argon, nitrogen, hydrogen, ammonia, air or steam.

The hydrocarbon may be selected from the group comprising: methane; ethane; propane; butane; pentane; hexane; ethylene; propylene; aliphatic or olefitic hydrocarbons wherein the number of carbon atoms is between 1 to 10 (i.e. 1, 2, 3, 4, 5, 6, 7, 8, 9 or 10); or mono- or bi-cyclic (either fused or discrete rings) aromatic hydrocarbons and olefines $C_xH_{2x}$ (where x is either 2, 3, or 4) or other gaseous hydrocarbon, or a hydrocarbon with a high vapor pressure, alcohol; or mixtures thereof. The gaseous hydrocarbon may comprise aliphatic or olefitic hydrocarbons wherein the number of carbon atoms is between 2 to 10. The gaseous hydrocarbon, which are supplied into the reaction chamber(s), serve as the source material for the carbon nanotubes, and may comprise mono- or bi-cyclic (either fused or discrete rings) hydrocarbons and olefines $C_xH_{2x}$ (where x is either 2, 3 or 4).

The method of the first aspect may further comprise removing the gaseous products of the hydrocarbon decomposition and the formed carbon nanotubes from the reaction chamber. The method may further comprise separating the carbon nanotubes from the gaseous products of the hydrocarbon decomposition.

According to a second aspect, there is provided a system for producing carbon nanotubes. The system may comprise a reactor comprising two electrodes. One of the electrodes may be at least a partially melted electrode. The at least partially melted electrode may comprise a catalyst. The reactor may be adapted for evaporating the at least partially melted electrode by an electrical arc discharge. The evaporated at least partially melted electrode may comprise an evaporated vapor. The evaporated vapor may comprise the catalyst. The reactor may be further adapted for condensing the evaporated vapors to form nanoparticles comprising the catalyst. The electrodes may be disposed in a reaction chamber. The reaction chamber may be adapted for decomposing gaseous hydrocarbons in the presence of the nanoparticles to form carbon nanotubes on the surface of the nanoparticles.

In any of the aspects or arrangements described herein, the system may also comprise one or more of any of the following either taken alone or in any suitable combination.

In an arrangement of the second aspect, there is provided a system for producing carbon nanotubes, comprising: a reactor comprising two electrodes, wherein one of the electrodes is at least a partially melted electrode comprising a catalyst, the reactor adapted for evaporating the at least partially melted electrode by an electrical arc discharge and for condensing its vapors to form nanoparticles comprising the catalyst. The electrodes are disposed in a reaction chamber for decomposing gaseous hydrocarbons in the presence of the nanoparticles to form carbon nanotubes on the surface of the nanoparticles.

The reactor may comprise a condensing region. Since the evaporation occurs primarily near the discharge arc, the condensation region is also close to the electrode. The catalyst nanoparticles may be formed in the condensing region, which may comprise the entire volume of the reaction chamber. The at least partially melted electrode is formed almost immediately after ignition of the electrical arc discharge, and the temperature of the arc is about 10,000 K. The temperature in the reaction chamber is different from the temperature in the evaporation zone and the temperature of the reaction chamber may typically be in the range of about 500-1200 degrees Celsius. In practice the arc temperature is around 1000 K, and similar temperatures near the electrode. The electrode temperature itself, near the discharge arc is high, but lower than in the arc itself. The temperature in the evaporation region (above the melted electrode) is about 5000 K, although this region is relatively small, compared to the size of the typical reaction chamber. Nanotubes will normally not form if the temperature is outside the range 500-1200 C. The condensing region may comprise a significant proportion of the reaction chamber and may comprise virtually the entire reaction chamber volume. The temperature of the condensing region may be readily controlled by modification of the arc temperature and hence the temperature in the evaporation region to optimize the synthesis conditions for nanotube synthesis for production of nanotubes with different characteristics.

The catalyst may comprise or be a transition metal selected from the group of a Group 8 element, a Group 6B element, a Group 5B element, or a mixture of two, three, four or more transition metal elements. The catalyst may comprise or be a transition metal selected from the group comprising scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, or a mixture comprising two, three, four or more transition metals. The catalyst may comprise or be a Group 8 metal selected from the group comprising: cobalt, nickel, ruthenium, rhodium, palladium, iridium, iron, platinum, or a mixture comprising two, three, four or more Group 8 metals. The catalyst may comprise or be a Group 6B element selected from the group comprising: chromium, molybdenum, tungsten or a mixture of two, three, four or more Group 6B elements. The catalyst may comprise or be a Group 5B element selected from the group comprising: vanadium; niobium, tantalum, or a mixture of two, three, four or more Group 5B elements. Alternatively, the catalyst may be a mixture of two, three, four or more elements selected from the group comprising: cobalt, nickel, ruthenium, rhodium, palladium, iridium, iron, platinum, chromium, molybdenum, tungsten, vanadium; niobium, tantalum or other Group 5B, Group 6 or Group 8 elements or transition metal.

The electrode may be entirely formed from the catalyst material, or may comprise a mixture of the catalyst and other metals. The electrode may comprise greater than 20%, greater than 30% greater than 40% greater than 50% greater than 60%, greater than 70%, greater than 80%, greater than 90% greater than 95% up to about 100% of catalyst material.

The system may further comprise a hydrocarbon source. The reactor may comprise an inlet port for admitting the gaseous hydrocarbons to the reactor chamber whereby the hydrocarbons are decomposed and interact with the catalyst nanoparticles to form the nanotubes. The gaseous hydrocarbons may be admitted to the reactor chamber at a flow rate of between about 5 and 20 grams per second, typically about 10 grams per second, depending on the reaction chamber size. A typical value would be 0.1-9 grams per 1 meter of reaction chamber volume. The reactor chamber may comprise an outlet port for outputting the catalyst nanoparticles with nanotubes formed thereon. The system may further comprise a processing unit. The processing unit may comprise a processing input port for accepting the nanoparticles with nanotubes formed thereon which are output from the reactor chamber output port. The processing unit may further comprise a separator for separating the breakdown products of the gaseous hydrocarbons from the nanotubes formed on the catalyst nanoparticles. The separation of the nanotubes may be performed in various ways as would be appreciated by the skilled addressee with consideration to technical and economic factors, for example using a filtration separation technique (e.g. using a fabric filter) or alternative techniques such as cyclone separation techniques. The gas that carries the nanotubes is supplied from the reactor, is cooled, and the resulting nanotubes, which are formed on the catalyst nanoparticles, are separated from the gas using known methods, e.g., using a cloth filter or a centrifuge.

The system may further comprise a processing unit that includes a processing input port for accepting the nanoparticles with nanotubes formed thereon output from the reactor chamber output port; a separator for separating the nanoparticles from the nanotubes formed thereon; and a processing output port for outputting separated nanotubes.

The system may comprise comprising first and second interconnected reaction chambers. Each reaction chamber may comprise respective first and second at least a partially melted electrodes, each comprising a catalyst. The first and second reaction chambers are interconnected by an arc discharge channel adapted to support the electrical arc discharge. The electrical arc discharge may be adapted to evaporate the at least partially melted electrode of each respective reaction chamber.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention. In the drawings:

Arrangements of the system and method for carbon nanotube synthesis will now be described, by way of an example only, with reference to the accompanying drawings wherein.

DETAILED DESCRIPTION OF THE PREFERRED EMBODIMENTS

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

Figure 2:
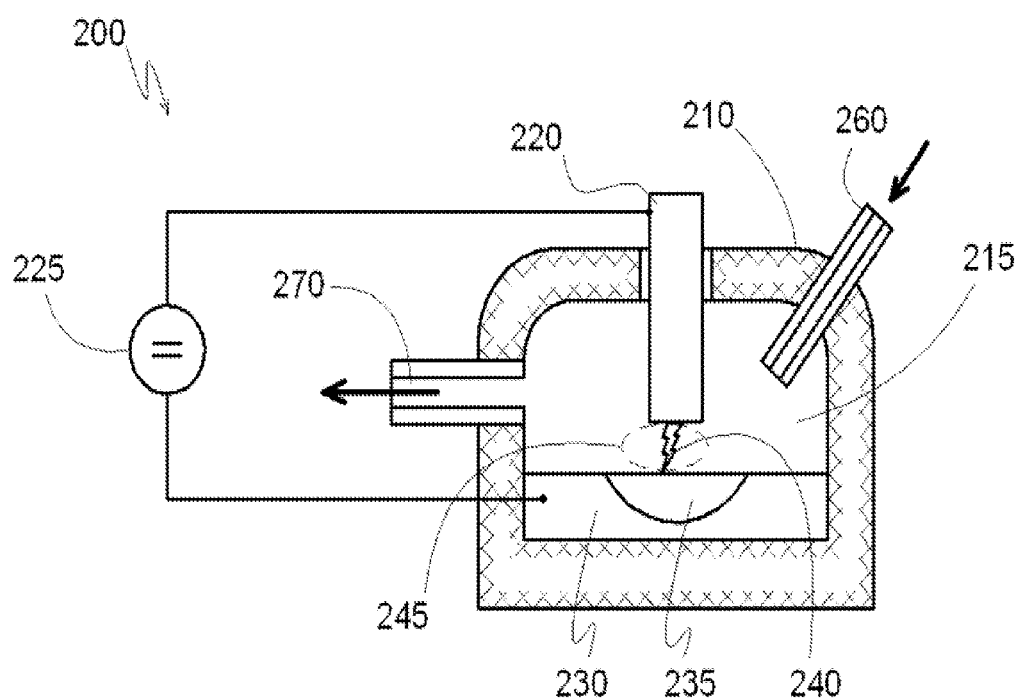
FIG. 2 is a schematic representation of a further arrangement of a system for carbon nanotubes synthesis comprising one at least partially melted electrode.
Figure 3:
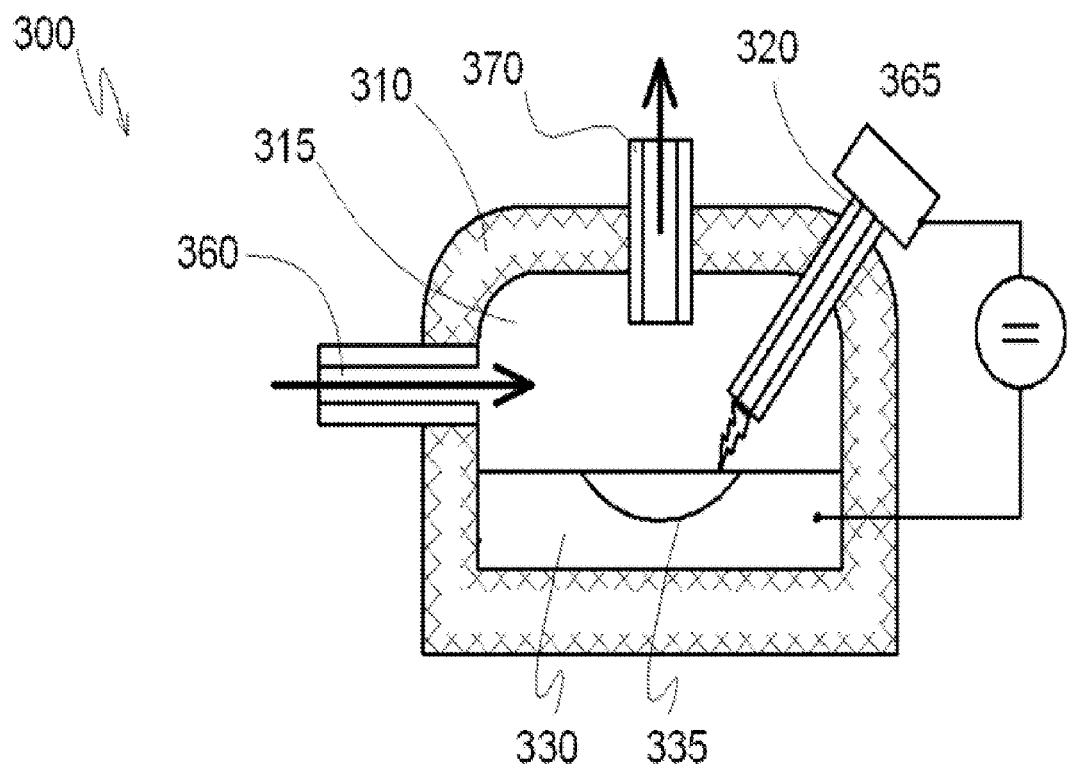
FIG. 3 is a schematic representation of a further arrangement of a system for carbon nanotubes synthesis comprising one at least partially melted electrode.

Referring to the drawings, the methods disclosed herein for the synthesis of nanotubes may be carried out in a plasma arc reactor, which may be embodied in various arrangements. For example, in some arrangements as depicted in FIGS. 1 to 3, the plasma arc reactor, comprising electrodes for formation of an electrical arc discharge, may comprise one electrode which is at least partially molten during operation of the reactor, and one solid electrode.

Figure 1:
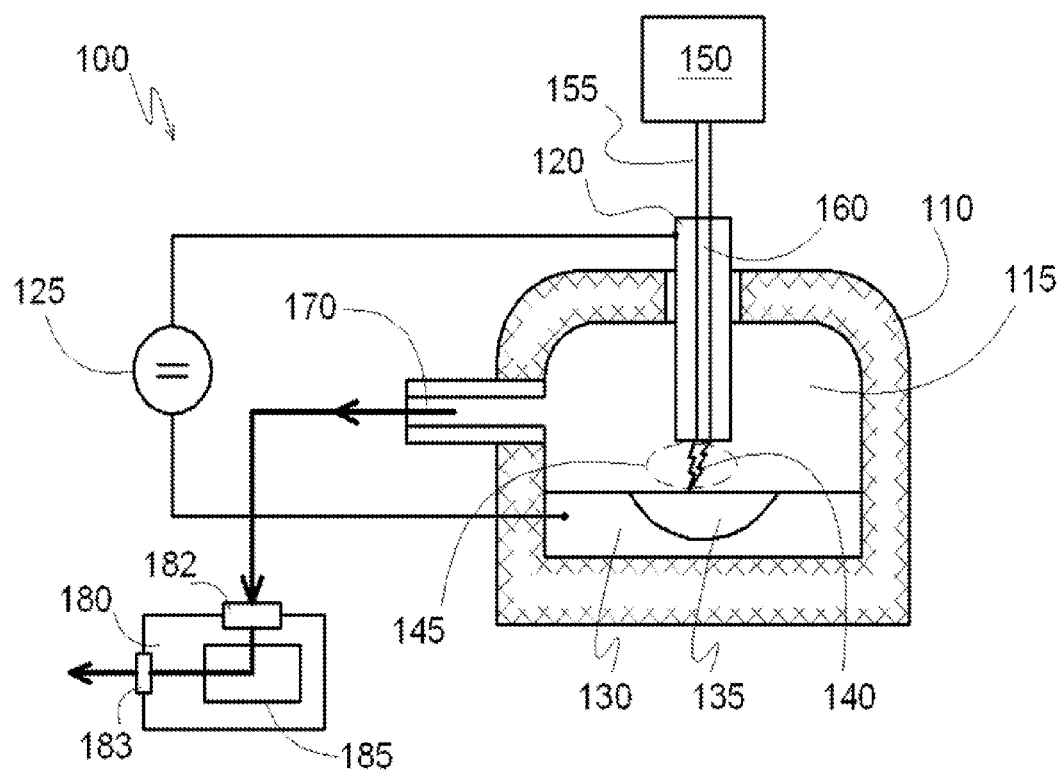
FIG. 1 is a schematic representation of an arrangement of a system for carbon nanotubes synthesis comprising one at least partially melted electrode.

FIG. 1 depicts an example system 100 for producing carbon nanotubes. The system 100 comprises a reactor 110 comprising a reaction chamber 115. Reactor 110 comprises two electrodes 120 and 130. One of the electrodes, electrode 130 depicted here, may be at least a partially melted electrode, wherein in use a portion 135 of electrode 130 is in molten form. The other electrode 120 in the present arrangement is a solid electrode and may be formed from graphite or alternative suitable material such as, for example, refractory metals and their alloys (e.g. tungsten, molybdenum etc). Solid electrode 120 may be positioned directly above the surface of at least partially melted electrode 130 at an angle at or about 90 degrees to electrode 130 as depicted in FIG. 1. In the present arrangement, the at least partially melted electrode 130 is located at the bottom of the reaction chamber. Electrode 130 may be realised in the form of an open volume of the reaction chamber 115 in a reservoir or container filled with a metal, for example with monolithic iron, or pieces of iron or alloys containing iron and other elements (manganese, etc.), as well as a catalyst material (in particular arrangements, iron itself may be the catalyst material). It should be noted that in operation, the electrode melts, initially forming an at least partially melted electrode, and may completely melt to form a melted electrode.

The electrodes 120 and 130 are arranged such that a voltage applied between them strikes an arc discharge 140 in the space between the electrodes. The electric arc discharge is formed between electrodes 120 and 130 using current source to induce a voltage potential difference between electrodes 120 and 130. In particular arrangements, an plasma arc torch may be used for formation of the electric arc discharge.

The at least partially melted electrode 130 comprises a catalyst and may be entirely formed from a catalyst material, or may comprise a mixture of the catalyst and other metals. The arc discharge 140 between electrodes 120 and 130 is adapted for evaporating the at least partially melted electrode 130 (i.e. molten portion 135) causing the at least partially molten portion 135 of electrode 130 to form an evaporated vapor (not shown). The evaporated vapor comprises catalyst particles from catalyst comprising electrode 130. The reactor 110 is further adapted for condensing the evaporated vapors to form nanoparticles (not shown) comprising the catalyst. The reaction chamber 115 is further adapted for decomposing gaseous hydrocarbons in the presence of the nanoparticles to form carbon nanotubes on the surface thereof. In a particular arrangement of system 100, electrode 130 is implemented in a form of a reservoir, filled with, for example, monolithic iron or pieces of iron or alloys containing iron and other elements (e.g., manganese, etc). During operation of system 100, electrode 130 can be fully melted and after one working session of the reactor will generally contains monolithic metal. The electrode composition includes a catalyst substance, for example, iron itself, with which reservoir is filled, can serve as a catalyst for nanotube production. In particular arrangements, the catalyst may comprise or be a transition metal for example either a Group 8 element, a Group 6B element, a Group 5B element, or a mixture of two, three, four or more transition metal elements.

The reactor may comprise a condensing region 145 adapted to be maintained at a lower temperature than the at least partially melted electrode, such that the evaporated vapors from the at least partially melted electrode 130 condense in the condensing region 145 and form the catalyst nanoparticles.

A hydrocarbon source 150 is provided to supply the gaseous hydrocarbon to the reaction chamber via gas transport line 155. The reactor 110 comprises a hydrocarbon inlet port 160 for admitting the gaseous hydrocarbons to the reactor chamber 115 whereby the hydrocarbons are decomposed in the presence of the catalyst nanoparticles in condensing region 145 (which may comprise the entire volume of reactor chamber 115) and therein interact with the nanoparticles to form the nanotubes in the reaction chamber 115. The gaseous hydrocarbons may be admitted to the reaction chamber 115 via inlet port 160 which may be in the form of a channel in the solid electrode 120 as depicted in FIG. 1 (or alternatively, as depicted in alternate arrangement 200, see FIG. 2, as a separate input channel 260 into the reactor chamber 215).

Once the plasma arc has formed, electrode 130 starts to melt (thereby forming at least a partially melted electrode) and evaporate into reaction chamber 115. Electrode 130 may start to melt immediately on commencement of a stable plasma arc discharge 140 between electrodes 120 and 130.

The evaporated vapor from the surface of catalyst comprising electrode 130 expands into the reactor chamber 115, resulting in a cooling of the evaporated vapors in the condensing region 145 of the chamber (which may comprise the entire volume of reactor chamber 115) thereby forming nanoparticles of the catalyst in the reactor chamber. The evaporated vapor can cool sufficiently once evaporated from the surface of the electrode, such that catalyst nanoparticles can be formed quite close to surface of at least partially melted electrode 130 and expand into the bulk of the reaction chamber. Reduction in volume of at least partially melted electrode 130 due to evaporation may be compensated by introducing additional quantity of the electrode/catalyst substance from which it is composed. Replenishment of the at least partially melted electrode 130 may be achieved by providing supply means to the electrode for example in the form of a chute in communication with the electrode 130 such that additional metal/catalyst can be added to the electrode, thereby enabling continuous operation of the reactor.

Gaseous hydrocarbons, for example methane, are admitted to the reaction chamber via inlet port 160 whereby the hydrocarbons are decomposed (for example, methane decomposition occurs according to the formula: $CH_4 \rightarrow C + 2H_2$) and interact in the reaction chamber 115 with the catalyst nanoparticles to form carbon nanotubes on the surface of the nanoparticles.

The reactor chamber further comprises an outlet port 170 for outputting the nanoparticles with carbon nanotubes formed thereon and residual decomposition products from the reactor chamber 115. In use, the carbon nanotubes grown on the catalyst nanoparticles in the reactor chamber 115, together with residual decomposition products (including disassociated hydrogen, residual disassociated carbon, catalyst nanoparticles without carbon nanotubes thereon, and other reaction by-products, e.g., residual evaporated vapors from the at least partially melted electrode, etc) are continuously extracted from the reaction chamber 115. The system may further comprise a processing unit 180 where the extracted materials are cooled and the desired nanotubes are separated from residual decomposition gases and/or the catalyst nanoparticles. Processing unit comprised a processing input port 182 for accepting the nanoparticles with nanotubes formed thereon, that are output from the reactor chamber output port 170. The processing unit 180 may further comprise a separator 185 for separating the nanoparticles from the nanotubes formed thereon. Once separated from the nanoparticles, the separated nanotubes are output from the processing unit through processing output port 183.

A further arrangement 300 of a system for producing carbon nanotubes is depicted in FIG. 3. In system 300, an arc discharge 140 is formed between a solid electrode 320—a plasma arc torch, and at least partially melted electrode 330, wherein a portion 335 of electrode 130 is in molten form. The plasma forming gas is introduced through port 365 to stabilize the discharge. A flow of gaseous hydrocarbons is introduced into reaction chamber 315 via inlet port 360. In operation, a plasma arc 340 is struck between electrodes 320 and 330 causing evaporation of catalyst comprising electrode 330 into the reaction chamber 315 where it cools in a condensing region to form a flow of catalyst nanoparticles in the reaction chamber. The gaseous hydrocarbons are decomposed onto the catalyst nanoparticles to form carbon nanotubes on the catalyst nanoparticles and residual gaseous hydrogen. The decomposition products and nanotube comprising nanoparticles are then extracted from reaction chamber 315 through outlet port 370 and the nanotubes are separated by further processing as above.

The system may comprise a plurality of reaction chambers. Each reaction chamber may comprise two electrodes, wherein one of the electrodes is at least a partially melted electrode comprising a catalyst, the system adapted for evaporating the at least partially melted electrode by the electrical arc discharge. As will be appreciated, various elements 150, 155, 160, 260, 360 described above (e.g., hydrocarbon source, inlet ports, supply lines, etc.) represent examples/elements of a means for supplying the gaseous hydrocarbon to the reaction chamber or chambers.

The system may comprise two reaction chambers interconnected by an arc discharge channel adapted to support the electrical arc discharge. The electrical arc discharge may be adapted to evaporate the at least partially melted electrode of each reaction chamber.

Figure 4:
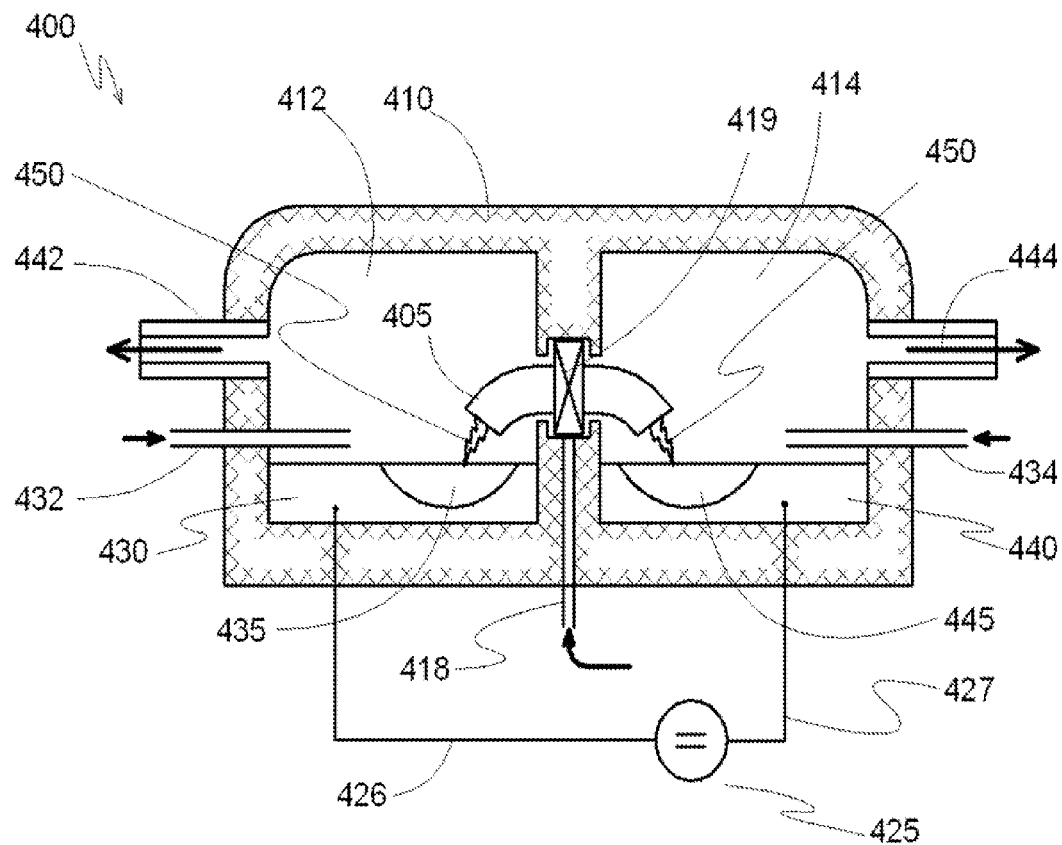
FIG. 4 is a schematic representation of a further arrangement of a system for carbon nanotubes synthesis comprising two at least partially melted electrodes.

A further arrangement 400 of an apparatus for forming carbon nanotubes is depicted schematically in FIG. 4. In this arrangement the reactor 410 comprises two reaction chambers 412 and 414, which may each be lined with refractory bricks. The electric arc discharge can be formed between two at least partially melted electrodes 430 and 440, each comprising a molten portion 435 and 445 respectively, one in each reaction chamber 412 and 414. As above, each of the at least partially melted electrodes comprises a catalyst, for example a transition metal, such as iron or other suitable catalyst. In a particular arrangement, each of the electrodes 430 and 440 are implemented in a form of a reservoir, filled with metal in a form of monolith, or in a form of metal pieces. As before, the composition of electrodes 430 and 440 include a catalyst substance as discussed above, for example iron can serve as a catalyst and scrap iron metal can be used for the electrodes. An example of a system 400 is provided in the present inventor's U.S. Pat. No. 6,846,467, the entire contents of which are incorporated herein by reference.

Reaction chambers 412 and 414 are interconnected by a discharge channel 405, through which, in use, the electric arc discharge 450 passes. The discharge channel is "tube-like" and bent in such a way that its ends (and outlets accordingly) are directed towards the surface of electrodes 430 and 440. The walls of the discharge channel 416 may be cooled, for example using water. The walls of the reaction chambers 412 and 414 of reactor 410 are formed with a heat-resistant lining.

The plasma forming gas is injected into the discharge channel 405 via inlet port 418, and may be injected in the form of vortex stream via a vortex chamber 419, which is designed such that the plasma-forming gas forms a vortex to stabilize the electric arc discharge 450 as would be appreciated by the skilled artisan. In use, an electric current is applied from current source 425, which is connected to electrodes 430 and 440 by wires 426 and 427. Current source 425 is adapted to set up a potential difference between electrodes 430 and 440 to form an electrical arc discharge (plasma arc) 450.

Reaction chambers 412 and 414 each comprise respective inlet ports 432 and 434 through which a flow of gaseous hydrocarbons is introduced into the respective reaction chambers. In use the same process occurs in each of reaction chambers 412 and 414. Under the influence of arc discharge 450, the electrodes 430 and 440 melt at least partially, forming at least partially molten portions 435 and 445, each of which thereby generating an evaporated vapor into the respective reaction chamber. The evaporated vapor condenses in the reaction chambers forming catalyst nanoparticles. The gaseous hydrocarbons admitted to respective reaction chambers via inlet ports 432 and 434 are decomposed in the presence of the nanoparticles to form carbon nanotubes on the surface thereof, and the resultant products are extracted from the reaction chambers 412 and 414 via respective outlet ports 442 and 444. Each of the at least partially melted electrodes 430 and 440 may comprise respective supply means (not shown) to enable replenishment of electrode/catalyst material to permit continuous operation of the reactor whereby gaseous hydrocarbons may be continuously fed into the chamber for continuous synthesis and extraction of carbon nanotubes.

Figure 5:
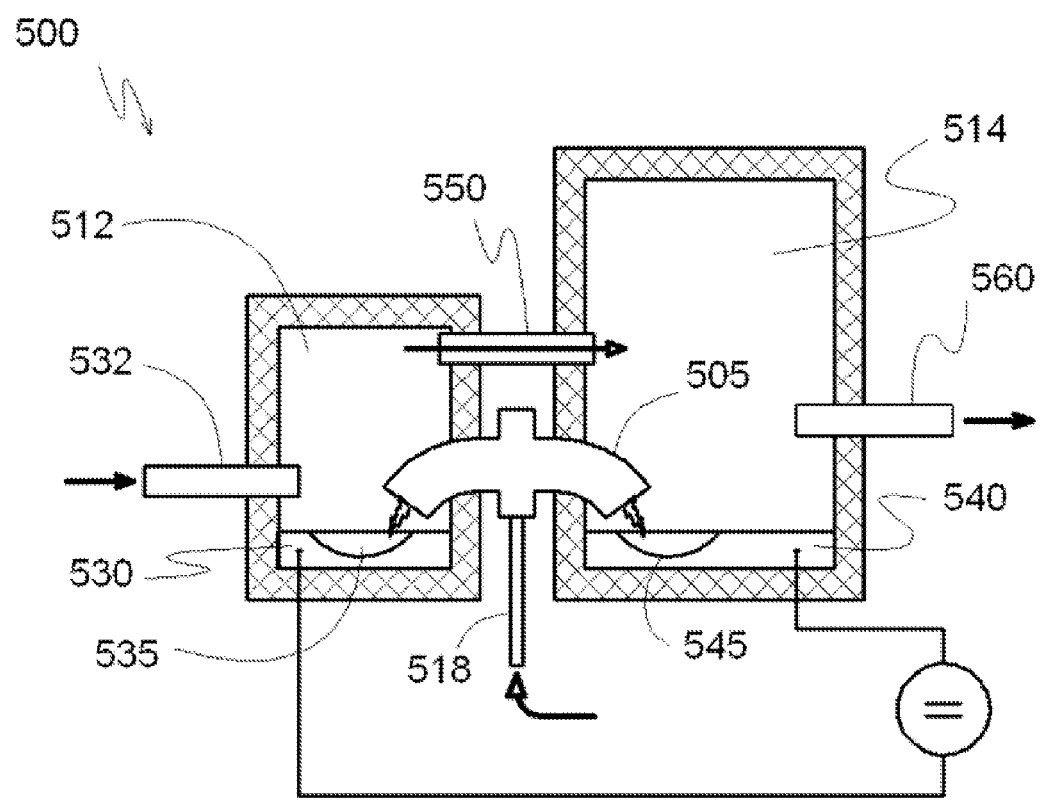
FIG. 5 is a schematic representation of a further arrangement of a system for carbon nanotubes synthesis comprising two at least partially melted electrodes and two reaction chambers.

A further system 500 for the production of nanotubes is depicted in FIG. 5. In this arrangement, the reactor also has two reaction chambers 512 and 514, each comprising an at least partially melted electrode, electrodes 530 and 540 respectively, wherein in operation each electrode comprises an at least partially molten portion 535 and 545 respectively. The reaction chambers 512 and 514 are interconnected as in system 400 by an arc discharge channel 505, to which plasma-forming gas is injected into the discharge channel 505 via inlet port 518. However, in the present arrangement, the reaction chambers 512 and 514 are not symmetrical. Reaction chamber 512 comprises an inlet port 532 for gaseous hydrocarbons, in which hydrocarbons are introduces to reaction chamber 512. As before, in operation, the at least partially molten catalyst comprising electrode evaporates into reaction chamber 512 and condenses to form catalyst nanoparticles on which carbon nanotubes from gaseous hydrocarbons are synthesized in reaction chamber 512. The synthesized nanotubes and decomposition products are extracted from reaction chamber 512 via flue 550 into reaction chamber 514, which has a much greater volume than that of reaction chamber 512. As the decomposition products from flue 550 expand into the greater volume of reaction chamber 514 additional catalyst nanoparticles are formed, in addition to the catalyst nanoparticles formed by catalyst evaporation and condensing of the at least partially melted electrode 540, thereby promoting additional nanoparticle growth and the additional growth of carbon nanotubes. The reaction chambers are maintained at a temperature necessary for synthesis of carbon nanotubes.

Finally, the nanotubes and residual decomposition products are extracted from reaction chamber 514 via outlet 560 for further processing and separation of the nanotubes from the decomposition products.

Figure 6:
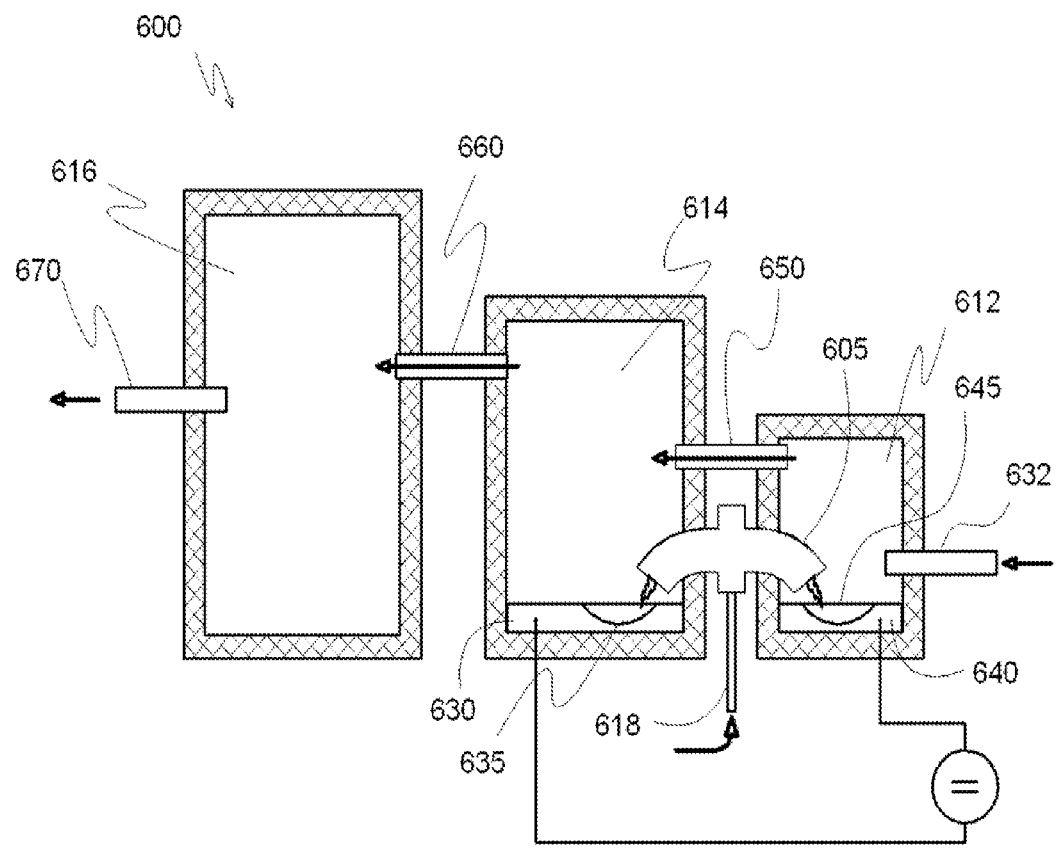
FIG. 6 is a schematic representation of a further arrangement of a system for carbon nanotubes synthesis comprising two at least partially melted electrodes and three reaction chambers.

A further embodiment of a system for the production of nanotubes is depicted as 600 in FIG. 6. In this arrangement, the reactor comprises three reaction chambers 612, 614 and 616, wherein the chamber volume increases in the direction of flow path. Thus, the first reaction chamber 612 has the smallest volume, and the third reaction chamber 616 the largest volume. In each chamber there is a growth of carbon nanotubes on catalyst nanoparticles. Similarly to system 500, reaction chambers 612 and 614 each comprise an at least partially melted electrode, electrodes 630 and 640 respectively, wherein in operation each electrode comprises an at least partially molten portion 635 and 645 respectively. The reaction chambers 612 and 614 are interconnected by an arc discharge channel 605, to which plasma-forming gas is injected into the discharge channel 605 via inlet port 618. Reaction chamber 612 comprises an inlet port 632 for gaseous hydrocarbons, in which hydrocarbons are introduces to reaction chamber 612.

As before, in operation, the at least partially molten catalyst comprising electrode evaporates into reaction chamber 612 and condenses to form catalyst nanoparticles on which carbon nanotubes from disassociated gaseous hydrocarbons are synthesized in reaction chamber 612. The synthesized nanotubes and decomposition products are extracted from reaction chamber 612 via flue 650 to reaction chamber 614, which has a much greater volume than that of reaction chamber 612. As the decomposition products from flue 650 expand into the greater volume of reaction chamber 614 additional catalyst nanoparticles are formed, in addition to the catalyst nanoparticles formed by catalyst evaporation and condensing of at least partially melted electrode 540, thereby promoting addition nanoparticle growth and the additional growth of carbon nanotubes.

The nanotubes and residual decomposition are then extracted from reaction chamber 614 via flue 660 to reaction chamber 616 which has a greater volume again.

Finally, the nanotubes and residual decomposition products are extracted from reaction chamber 616 via outlet 670 for further processing and separation of the nanotubes from the decomposition products.

Figure 7:
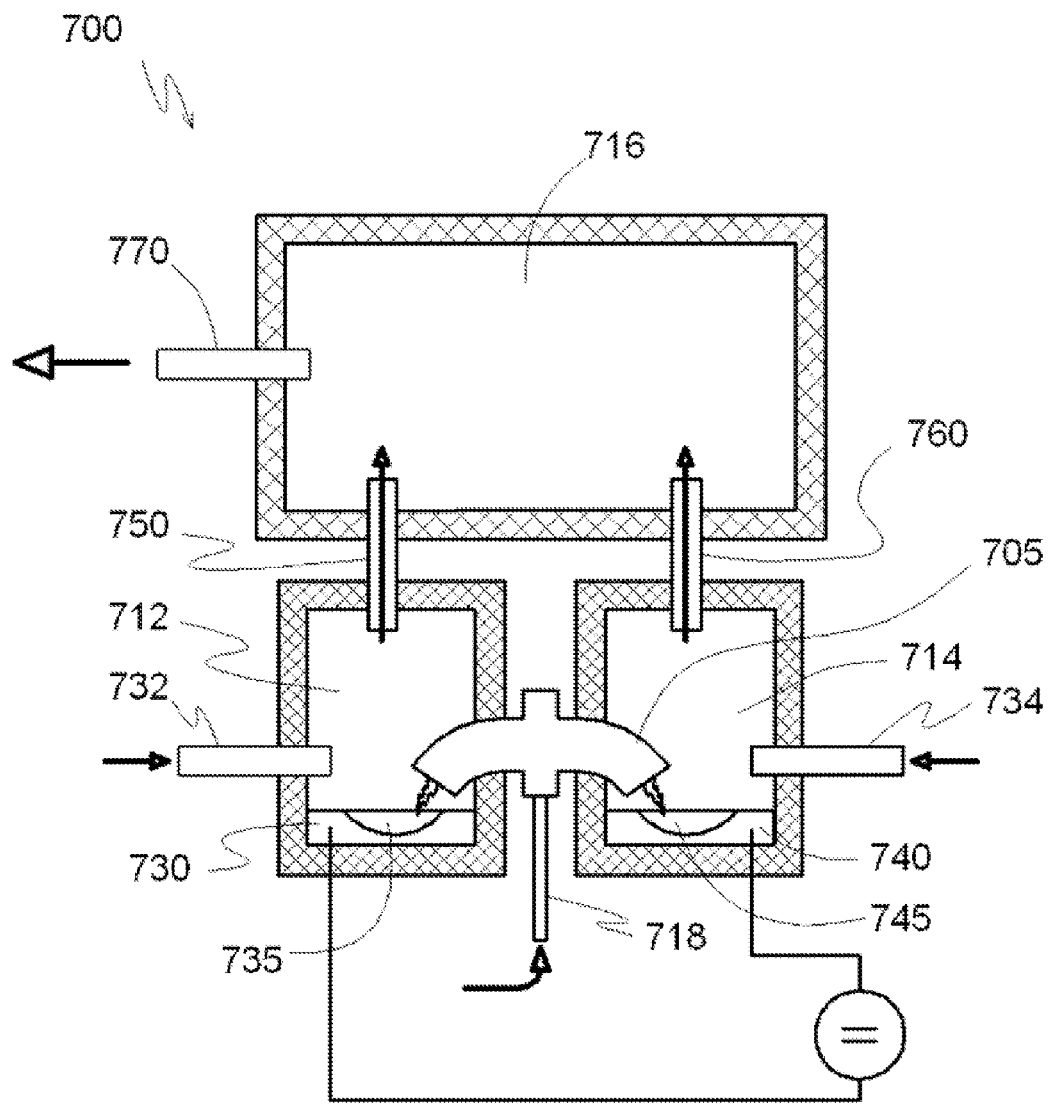
FIG. 7 is a further schematic representation of a further arrangement of a system for carbon nanotubes synthesis comprising two at least partially melted electrodes and three reaction chambers.

A further embodiment system 700 for the production of nanotubes is depicted as 700 in FIG. 7. In this arrangement, the reactor comprises three reaction chambers 712, 714 and 716 wherein reaction chambers 712 and 714 are of similar volume and operate similarly to reaction chambers 432 and 434 of system 400 depicted in FIG. 4, however, in this arrangement, the reaction and decomposition products of each of chambers 712 and 714 are extracted to a third chamber 716 which has a greater volume than that of reaction chambers 712 and 714, for further condensation of the evaporated catalyst to form additional catalyst nanoparticles to promote additional nanotube synthesis thereon.

Similarly to systems 400, 500 and 600, reaction chambers 712 and 714 each comprise an at least partially melted electrode, electrodes 730 and 740 respectively, wherein in operation each electrode comprises an at least partially molten portion 735 and 745 respectively. The reaction chambers 712 and 714 are interconnected by an arc discharge channel 705, to which plasma-forming gas is injected into the discharge channel 705 via inlet port 718. Reaction chamber 712 comprises an inlet port 732 for gaseous hydrocarbons, in which hydrocarbons are introduces to reaction chamber 712. As before, in operation, the at least partially molten catalyst comprising electrode 730 evaporates into reaction chamber 712 and condenses to form catalyst nanoparticles on which carbon nanotubes from disassociated gaseous hydrocarbons are synthesized in reaction chamber 712.

Similarly, reaction chamber 714 comprises an inlet port 734 for gaseous hydrocarbons, in which hydrocarbons are introduces to reaction chamber 714. In operation, the at least partially molten catalyst comprising electrode 740 evaporates into reaction chamber 714 and condenses to form catalyst nanoparticles on which carbon nanotubes from disassociated gaseous hydrocarbons are synthesized in reaction chamber 714.

The synthesized nanotubes and decomposition products are extracted from reaction chambers 712 and 714 via respective flues 750 and 760 to a third reaction chamber 716 which has a much greater volume than that of reaction chambers 712 and 714. As the decomposition products from flues 750 and 760 expand into the greater volume of reaction chamber 716 additional catalyst nanoparticles are formed, thereby promoting addition nanoparticle growth and the additional growth of carbon nanotubes in reaction chamber 716.

In each of the arrangements described herein, the decomposition of the gaseous hydrocarbons occurs at temperatures in the range of between about 700 to 1000 degrees Celsius, therefore, each of the reaction chambers in each of the above arrangements must be maintained at temperatures in this range.

EXAMPLE 1

In a reactor system for producing carbon nanotubes containing two separate reaction chambers 412 and 414 connected by a discharge channel 405, for example as described with reference to FIG. 4 is provided, wherein the volume of each reaction chamber is about 5 m$^3$. At the bottom of each reaction chamber 412 and 414 reservoirs are formed which are open in the volume of the respective reaction chambers. The reservoirs are lined with refractory bricks and completely filled with a catalyst comprising monolithic iron forming electrodes 430 and 440. The volume of each reservoir is about 50 liters, and each is equipped with a conductor for supplying electrical voltage directly to the metal catalyst electrodes 430 and 440. Each reaction chamber 412 and 414 has a respective inlet port 432 and 434 for introducing gaseous hydrocarbons into the reactor chambers and a respective outlet port 442 and 444 for extracting the reaction products from each respective reaction chamber.

The discharge channel 405 connecting the reaction chambers 412 and 414 is shaped like a symmetrical arc, and the walls of the discharge channel 405 are cooled by water to protect the discharge channel against the high temperatures in the reactor chambers. Discharge channel is designed such that plasma-forming gas supplied through inlet port 418 forms a vortex flow in the discharge channel 405 thereby stabilizing an electric arc (plasma) discharge in the channel.

A plasma-forming gas is fed to discharge channel 405 at a rate of about 1.5 g/sec via inlet port 418 and vortex chamber 419 which is ignited to form a plasma arc discharge in the channel 405. Plasma-forming gas is continued to be introduced to the discharge channel via inlet port 418 to sustain the plasma arc and the arc current was maintained at about 600 A by current source 425. At this current, the arc voltage is approximately 800V.

Under the influence of the electric arc discharge 450, electrodes 430 and 440 begin to melt and the electrode catalyst-comprising material evaporates into each respective reaction chamber. The temperature in the volume of the reaction chambers reaches approximately 800 to 950 degrees Celsius. The evaporated catalyst-comprising material condenses in the reaction chambers to form nanoparticles of the catalyst material.

Simultaneously, each of the reaction chambers is fed with a gaseous hydrocarbon source, in the present example methane, at a flow rate of about 10 grams/second (in each chamber). In the volume of each reaction chamber, the methane decomposes to form carbon and hydrogen by-products, and the carbon is deposited on the surface of the catalyst nanoparticles, resulting in the growth of carbon nanotubes on the catalyst nanoparticles. Carbon nanotubes grown on the surface of catalyst nanoparticles, together with the residual decomposition products of hydrocarbons are extracted from each of the reaction chambers by respective outlet ports and transported to a further processing unit (e.g. processing unit 180 as depicted in FIG. 1) where the nanotubes are separated by a suitable technique such as filtration to provide a pure nanotube product.

EXAMPLE 2

The reactor has three chambers, as shown in FIG. 6. Inside, each reaction chamber is lined with fire-resistant bricks. The first reaction chamber, which has a volume of about 1 m$^3$, and the second reaction chamber, which has a volume of about 2 M$^3$, are connected by a discharge channel and a gas pipe. The second reaction chamber is connected to the third reaction chamber (which has a volume of about 7 m$^3$) by a gas pipe. First reaction chamber has a chamber for supplying gaseous hydrocarbons. The third reaction chamber has a channel for outflow of gas from the reaction chamber. The first and second reaction chambers have electrodes that include a catalyst—monolithic iron. The volume of each reservoir is about 50 liters. Each reservoir has a conductor to supply the voltage directly to the metal. The reservoirs with the metal function as electrodes.

The discharge channel that connects the first and second chambers is in the form of a symmetrical arc. Each cross-section of the discharge channel, in the section perpendicular to its axis, is a circle of a 40 mm diameter. The length of the channel along its axis is about 400 mm. The walls of the discharge channel are cooled with water. The discharge channel has two electrically isolated sections, which are connected through a vortex chamber, located in the central part of the discharge channel. The vortex chamber is shaped such that the plasma forming gas supplied into it can form a vortex that can stabilize the discharge arc.

The electrical arc grows due to the supply of the plasma forming gas, supplied through the vortex chamber. The current through the arc is maintained at 600 A. The voltage, with such a current, is about 800 volts. The metal electrodes melt due to the effect of the electrical arc, and the electrode material evaporates. Iron vapors, supplied into the first and second reaction chambers, condense, forming catalyst nanoparticles. At the same time, gaseous carbohydrates are supplied into the first reaction chamber (methane, 5 grams per second). Some of the hydrocarbons break down in the first reaction chamber, on the surface of the catalyst nanoparticles, which ensures growth of the carbon nanotubes on the catalyst nanoparticles. The mixture of gaseous hydrocarbons, carbon nanotubes and iron nanoparticles is supplied from the first chamber into the second chamber through the gas pipe. Similarly, methane is supplied to the second reaction chamber, at a rate of 5 grams per second. Since catalyst nanoparticles are formed in the second chamber as well, hydrocarbons break down on their surface here as well, providing for growth of the nanotubes on the surface of the nanoparticles. Also, there is additional growth of the nanotubes formed in the first reaction chamber.

Then the mixture of gaseous hydrocarbons, carbon nanotubes and iron nanoparticles is supplied to the third reaction chamber. Methane, 15 grams/second, is also supplied into the third reaction chamber, thereby providing for additional growth of the nanotubes and formation of new nanotubes. Gas temperature in the third reaction chamber is maintained at 750-900° C. Carbon nanotubes and other reaction products are removed from the third reaction chamber and are filtered.

EXAMPLE 3

The reactor for manufacturing of carbon nanotubes includes three sequentially arranged reaction chambers, as shown in FIG. 6. Inside, each reaction chamber is lined with fire resistant brick. The first reaction chamber (in order from right to left) has a volume of 0.4 m$^3$, and the second reaction chamber, which has a volume of 0.6 m$^3$, are connected to each other by a discharge channel and a gas pipe. The second reaction chamber is connected to the third reaction chamber, which has a volume of 1 m$^3$, by a gas pipe. Each chamber includes channel/ports for supplying of gaseous hydrocarbons. The third reaction chamber has a channel for pumping out the gas from the reaction chamber volume. In the bottom of the first and second reaction chambers there are reservoirs, which are open into the volume of their corresponding reaction chambers, lined with fire resistant brick, and fully filled with a catalyst—monolithic iron. The volume of each reservoir is 50 liters.

Each reservoir is provided with a conductor for supplying voltage directly to the metal. The reservoirs with the iron function as electrodes.

The discharge channel, that connects the first and second reaction chambers, is in the is shape of a symmetrical arc. Each cross section of the channel, in a direction perpendicular to its axis, is a circle with a diameter of 40 millimeters. The length of the discharge channel along its length is 400 millimeters. The walls of the discharge channel are cooled with water. The discharge channel comprises two electrically isolated sections. The sections are connected through a vortex chamber, located in the central portion of the discharge channel. The vortex chamber is shaped such that the plasma forming gas, flowing through it into the discharge channel, forms a vortex, which can stabilize the electrical arc discharge. The third chamber includes a 20 kilowatt heater.

After starting the reactor, the current through the electrical arc discharge is maintained at 600 amperes. Under the influence of the electric arc discharge, the electrodes, that are formed of iron, melt, and the electrode material evaporates. Iron vapors, supply into the volume of the first and second reaction chambers, condensed, thereby forming catalyst nanoparticles. Simultaneously, a gaseous hydrocarbon—methane, supplied at a rate of 1.5 grams per second, is provided into the first reaction chamber. Some of the hydrocarbons break down into the first reaction chamber on the surface of the catalyst nanoparticles, which provides for a growth of carbon nanotubes on the catalyst nanoparticles. The mixture of the gaseous hydrocarbons, carbon nanotubes and iron nanoparticles are supplied, through the gas pipe, into the second reaction chamber volume. Also, gaseous hydrocarbons—methane, 1.5 grams per second—is supplied into the second reaction chamber as well. In the volume of the second reaction chamber there is formation of the catalyst nanoparticles, on their surface there is also a breakdown of the hydrocarbons, which also provides for a growth of the carbon nanotubes on the catalyst nanoparticle surface. Furthermore, there is additional growth of nanotubes that were originally formed in the first reaction chamber, in the second reaction chamber.

Then, the mixture of gaseous hydrocarbons, carbon nanotubes and iron nanoparticles are supplied into the third reaction chamber through a gas pipe. Additionally, gaseous hydrocarbons, in the form of methane, are also supplied into the third reaction chamber, in order to enable additional growth of the carbon nanotubes that were previously formed in the first reaction chamber and the second reaction chamber, as well as to provide for formation of additional nanotubes. The temperature of the gas in the third reaction volume is maintained in the range of 750-1000° C. Carbon nanotubes, grown on the surface of the catalyst nanoparticles, together with the reduction products of the hydrocarbon breakdown, are removed from the third reaction chamber volume, are cooled, and are then filtered.

INDUSTRIAL APPLICABILITY

Carbon nanostructures, due to its size and unique electrical, thermal, chemical and mechanical properties are increasingly used in various industries. Thus, carbon nanotubes can be used in the manufacture of adsorbents, catalyst supports, chromatographic stationary phases, different composite materials. These properties of carbon nanotubes as mechanical flexibility and a noticeable conductivity to explain the use of such materials in the electronics industry. Biocompatibility with human tissues and animal causes the possibility of their use in medicine, such as a carrier for targeted drug delivery agents.

It will be appreciated that the methods/apparatus/devices/systems described/illustrated above at least substantially provide an improved synthesis methods for forming carbon nanotubes having high yield, and systems and apparatus for producing carbon nanotubes in accordance with the synthesis methods disclosed herein.

The methods, systems and apparatus described herein, and/or shown in the drawings, are presented by way of example only and are not limiting as to the scope of the invention. Unless otherwise specifically stated, individual aspects and components of the disclosed methods, systems and apparatus may be modified, or may have been substituted therefore known equivalents, or as yet unknown substitutes such as may be developed in the future or such as may be found to be acceptable substitutes in the future. The disclosed methods, systems and apparatus may also be modified for a variety of applications while remaining within the scope and spirit of the claimed invention, since the range of potential applications is great, and since it is intended that the presently disclosed methods, systems and apparatus be adaptable to many such variations.

What is claimed is:

1. A reactor for producing carbon nanotubes, comprising:
   a reaction chamber;
   two electrodes in the reaction chamber, wherein one of the electrodes is at least partially melted and is in a form of a reservoir of liquid phase catalyst material, wherein a solid portion of the one of the electrodes is a boundary of the reservoir, and wherein the other electrode is located above the one of the electrodes,
   an electrical arc discharge between the two electrodes;
   catalyst nanoparticles of the same material as the two electrodes; and
   carbon nanotubes on surfaces of the catalyst nanoparticles.

2. The reactor of claim 1, wherein the reaction chamber comprises an inlet port for admitting the gaseous hydrocarbons to the reaction chamber.

3. The reactor of claim 1, wherein the reactor chamber comprises an outlet port for outputting the catalyst nanoparticles with the carbon nanotubes thereon.

4. The reactor of claim 1, further comprising a processing unit, the processing unit comprising a processing input port for accepting the catalyst nanoparticles with the carbon nanotubes thereon from the reactor chamber output port;
   a separator for separating the nanoparticles with the carbon nanotubes thereon from the gaseous hydrocarbons.

5. The reactor of claim 1, wherein the at least partially melted electrode comprises metal.

6. The reactor of claim 1, wherein the other electrode is a solid electrode.

7. The reactor of claim 6, wherein the solid electrode comprises graphite, a refractory metal or a refractory metal alloy.

8. The reactor of claim 1, wherein material of the electrodes is selected from the group consisting of a Group 8 transition metal, a Group 6B transition metal, a Group 5B transition metal, and a mixture of two, three, four or more transition metal elements.

9. A reactor for producing carbon nanotubes, comprising:
   a first reaction chamber and a second reaction chamber in communication with the first reaction chamber through a discharge channel;

the first and second reaction chambers each having at least one electrode inside its corresponding reaction chamber, the electrodes being formed of a catalyst material, the electrode in the first reaction chamber is partly in a solid phase and partly in a liquid phase, with at least some portion of the catalyst material of the electrode in a form of catalyst nanoparticles for catalyzing formation of carbon nanotubes;

an electric discharge arc in the discharge channel between the first and second chambers;

each reaction chamber having an inlet for admitting gaseous hydrocarbons into the reaction chamber;

the first reaction chamber having an outlet for supplying the carbon nanotubes into the second chamber, wherein the carbon nanotubes adhere to surfaces of the catalyst nanoparticles.

10. The reactor of claim 9, wherein the reaction chambers are interconnected by a discharge channel, wherein the electric arc discharge passes through the discharge channel.

11. The reactor of claim 9, wherein a plasma-forming gas is in the discharge channel in a form of a vortex stream, and wherein the plasma-forming gas is selected from the group consisting of gaseous hydrocarbon, an inert gas, hydrogen, nitrogen or ammonia.

12. A reactor for producing carbon nanotubes, comprising:
first, second and third reaction chamber, the first and second reaction chambers comprising two electrodes, wherein one of the electrodes is at least partially in a liquid phase, an electrical arc discharge in contact with the liquid phase, and wherein the liquid phase includes a catalyst material;

the first, second and third reaction chambers containing the catalyst material in a form of catalyst nanoparticles from a condensed vapor phase of the catalyst material, wherein the electrodes are disposed in their corresponding reaction chambers and the carbon nanotubes adhere to the catalyst nanoparticles, and wherein gaseous hydrocarbons are in the first reaction chamber, the catalyst nanoparticles and gaseous hydrocarbons and products of gaseous hydrocarbon breakdown have a conduit from the first reaction chamber into the second reaction chamber, and from the second reaction chamber into the third reaction chamber.

13. The reactor of claim 12, further comprising means for supplying additional gaseous hydrocarbons into the second and third reaction chambers.

14. The reactor of claim 12, wherein the third reaction chamber is at a temperature of 500-1200° C.

15. The reactor of claim 12, wherein the gaseous hydrocarbon is selected from the group consisting of: methane, ethane, propane, butane, pentane, hexane, ethylene, propylene, aliphatic or olefitic hydrocarbons wherein the number of carbon atoms is between 1 to 10, mono- or bi-cyclic aromatic hydrocarbons and olefines $C_xH_{2x}$ (wherein x is either 2, 3, or 4) and mixtures thereof.

16. A reactor for producing carbon nanotubes, comprising:
a first reaction chamber, a second reaction chamber and a third reaction chamber;

a discharge channel connecting the first and second reaction chambers;

a first electrode located within the first reaction chamber and is in a liquid phase;

a second electrode located within the second reaction chamber and is in a liquid phase;

a third electrode located within the third reaction chamber and is in a liquid phase;

an electrical arc discharge in contact with the first, second and third electrodes;

the first, second and third electrodes including a catalyst material;

a first inlet port for supplying gaseous hydrocarbons into the first reaction chamber;

a second inlet port for supplying gaseous hydrocarbons into the second reaction chamber;

the first, second and third reaction chambers containing catalyst nanoparticles formed of the catalyst material;

the catalyst nanoparticles having carbon nanotubes adhering to their surfaces; and means for supplying the carbon nanotubes, the gaseous hydrocarbons and their breakdown products into the third reaction chamber from the first and second reaction chambers.

17. The reactor of claim 16, further comprising a third inlet port for supplying additional gaseous hydrocarbons into the third reaction chamber.

18. The reactor of claim 16, wherein the third reaction chamber is at a temperature of 500-1200° C.

* * * * *